US011949199B2

(12) United States Patent
Fukagawa et al.

(10) Patent No.: US 11,949,199 B2
(45) Date of Patent: Apr. 2, 2024

(54) TERMINAL BLOCK AND AIR CONDITIONER

(71) Applicant: DAIKIN INDUSTRIES, LTD., Osaka (JP)

(72) Inventors: Kazunari Fukagawa, Osaka (JP); Koushou Shouyama, Osaka (JP); Ryuuichi Toyota, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/771,123

(22) PCT Filed: Nov. 26, 2018

(86) PCT No.: PCT/JP2018/043410
§ 371 (c)(1),
(2) Date: Jun. 9, 2020

(87) PCT Pub. No.: WO2019/116872
PCT Pub. Date: Jun. 20, 2019

(65) Prior Publication Data

US 2021/0167528 A1 Jun. 3, 2021

(30) Foreign Application Priority Data

Dec. 13, 2017 (JP) ................................ 2017-238799

(51) Int. Cl.
*H01R 9/24* (2006.01)

(52) U.S. Cl.
CPC .................................. *H01R 9/2408* (2013.01)

(58) Field of Classification Search
None
See application file for complete search history.

(56) References Cited

U.S. PATENT DOCUMENTS 3,474,397 A 10/1969 Piasecki
5,951,306 A * 9/1999 Millhimes ............ H01R 13/514
439/79

(Continued)

FOREIGN PATENT DOCUMENTS

GB 815293 A 6/1959
GB 1147933 A 4/1969
JP S54169285 U 11/1979

(Continued)

OTHER PUBLICATIONS

International Search Report issued in International Application No. PCT/JP2018/043410, dated Jan. 8, 2019 (5 pages).

(Continued)

*Primary Examiner* — Felix O Figueroa
(74) *Attorney, Agent, or Firm* — Osha Bergman Watanabe & Burton LLP

(57) ABSTRACT

A terminal block includes: a first split body that includes one or more terminal connection parts and a first coupling portion; a second split body that includes one or more terminal connection parts and a second coupling portion coupled to the first coupling portion; and a coupling member that couples the first coupling portion to the second coupling portion and fixes the first split body and the second split body to a mount to which the terminal block is mounted.

10 Claims, 10 Drawing Sheets

(56) References Cited

U.S. PATENT DOCUMENTS

| | | | | |
|---|---|---|---|---|
| 6,409,540 | B1 | 6/2002 | Kodama | |
| 6,659,810 | B2 * | 12/2003 | Okabe | H01R 13/6215 439/364 |

FOREIGN PATENT DOCUMENTS

| | | | |
|---|---|---|---|
| JP | S5762383 | U | 4/1982 |
| JP | H06-62490 | U | 9/1994 |
| JP | H08-171952 | A | 7/1996 |
| JP | H10-228958 | A | 8/1998 |

OTHER PUBLICATIONS

English Translation of the International Preliminary Report on Patentability issued in corresponding International Patent Application No. PCT/JP2018/043410, dated Jun. 25, 2020 (8 pages).

Extended European Search Report issued in corresponding European Application No. 18888109.8, dated Dec. 18, 2020 (7 pages).

* cited by examiner

TERMINAL BLOCK AND AIR CONDITIONER

TECHNICAL FIELD

The present invention relates to a terminal block and an air conditioner.

BACKGROUND

Patent Literature 1 discloses a terminal block including a plurality of single-pole units arranged side by side and coupled to one another.

As disclosed in Patent Literature 1, the single-pole units are coupled to one another with a laterally longer bolt passing through the single-pole units and a nut into which the bolt is screwed. The terminal block disclosed in Patent Literature 1 has a rail fitting portion formed on its bottom face, and is fixed to the interior of a board in such a manner that a rail on the board is fitted into the rail fitting portion. In other words, the terminal block disclosed in Patent Literature 1 separately includes means for coupling the single-pole units and means for fixing the terminal block to the interior of the board. It is therefore necessary to perform an operation of coupling the single-pole units and an operation of attaching the terminal block to the interior of the board, independently of each other.

PATENT LITERATURE

Patent Literature 1: Japanese Unexamined Patent Publication No. 08-171952

SUMMARY

One or more embodiments of the present invention provide a terminal block that achieves coupling of a plurality of split bodies making up the terminal block, simultaneously with fixing of the split bodies to a mount member, and an air conditioner that includes the terminal block.

(1) A terminal block according to one or more embodiments of the present invention includes:

a first split body that includes one or more terminal connection parts and a first coupling portion;

a second split body that includes one or more terminal connection parts and a second coupling portion coupled to the first coupling portion; and a coupling member that couples the first coupling portion to the second coupling portion and is configured to fix the first split body and the second split body to a mount member to which the terminal block is mounted.

This configuration achieves coupling of the first split body to the second split body simultaneously with fixing of the first split body and the second split body to the mount member.

(2) The first coupling portion and the second coupling portion may be positioned with the first coupling portion and the second coupling portion lying on top of each other, and the coupling member is a coupling bolt to be screwed into the mount member, the coupling bolt passing through the first coupling portion and the second coupling portion in a direction in which the first coupling portion and the second coupling portion lie on top of each other.

With this configuration, the first coupling portion and the second coupling portion can be both fastened to the mount member with the coupling bolt and fixed to the mount member. It is possible to fix the first split body and the second split body to the mount member while connecting them.

(3) The first coupling portion may be couplable to the second coupling portion of a plurality of types of second split bodies having different numbers of poles.

This configuration reduces kinds of components for forming a plurality of types of terminal blocks having different numbers of poles.

(4) At least one of the first split body or the second split body may have a detent portion restricting rotation of the terminal block about the coupling member.

With this configuration, the terminal block is stably mounted to the mount member.

(5) A plurality of types of the terminal blocks having different numbers of poles may have a common relative positional relationship between the coupling member and the detent portion.

With this configuration, a plurality of types of the terminal blocks are mounted to the mount member having one set of a portion to which the coupling member is attached and a portion on which the detent portion acts.

(6) In the terminal block as recited in (3), the first split body may have a detent portion restricting rotation of the terminal block about the coupling member.

With this configuration, a plurality of types of the terminal blocks are mounted to the mount member having one set of a portion to which the coupling member is attached and a portion on which the detent portion acts.

(7) The detent portion may be a protrusion configured to engage with the mount member.

This configuration simplifies a structure of the detent portion.

(8) The first coupling portion and the second coupling portion may engage with each other against movements of the first coupling portion and second coupling portion away from each other.

With this configuration, the first split body is coupled to the second split body more firmly.

(9) Each of the first split body and the second split body may have an accommodation space in which a terminal connected to each terminal connection part is entirely accommodated.

This configuration avoids contact between adjacent terminals connected to the terminal connection part of each split body, and therefore eliminates a necessity to prepare, for example, a protection covering for avoiding the contact between the adjacent terminals.

(10) An air conditioner according to one or more embodiments of the present invention includes the terminal block as recited in any one of (1) to (9).

DETAILED DESCRIPTION

Hereinafter, embodiments of a terminal block will be described in detail with reference to the accompanying drawings.

Figure 1:
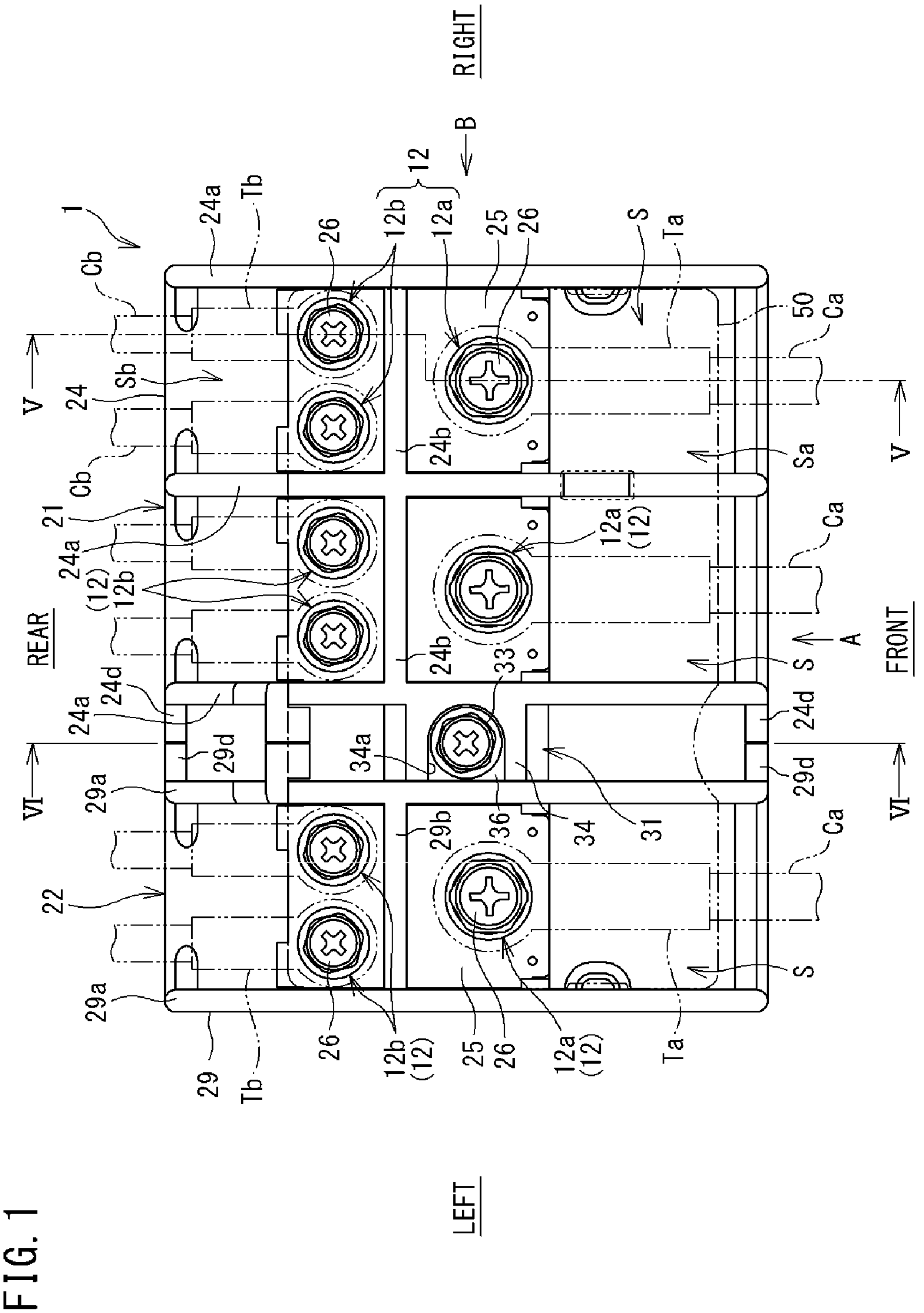
FIG. 1 is a plan view of a three-pole terminal block according to one or more embodiments.
Figure 2:
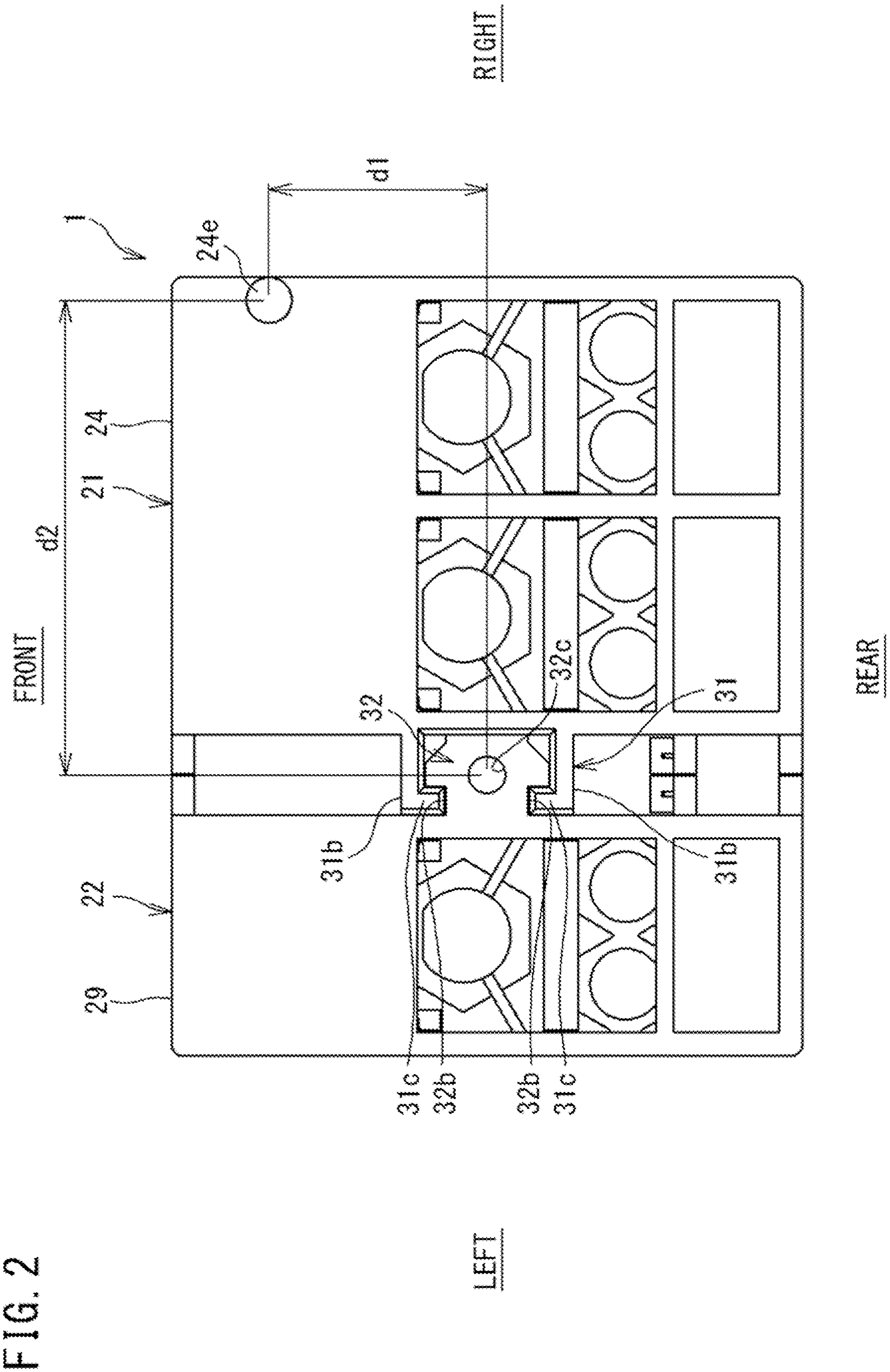
FIG. 2 is a bottom view of the terminal block illustrated in FIG. 1.

FIG. 1 is a plan view of a three-pole terminal block according to one or more embodiments. FIG. 2 is a bottom view of the terminal block. In the following description, for convenience, the lower side, upper side, right side, and left side of FIG. 1 are respectively defined as the front side, rear side, right side, and left side of the terminal block.

A terminal block 1 according to one or more embodiments of the present invention is used for, for example, an air conditioner. Specifically, the terminal block 1 is accommodated in an electric component box disposed in an outdoor unit of an air conditioner. The terminal block 1 is connected to cables Ca for a commercial power source, the cables Ca being drawn into the electric component box from the outside. The terminal block 1 is also connected to cables Cb for feeding electric power to loads, such as electric equipment, in the outdoor unit. The terminal block 1 has an upper face covered with a plate-shaped cover 50 detachably attached thereto.

The terminal block 1 includes three terminal connection parts 12. Each of the terminal connection parts 12 includes a primary-side connection part 12*a* and secondary-side connection parts 12*b*. The primary-side connection parts 12*a* are disposed on the front side of the terminal block 1. The secondary-side connection parts 12*b* are disposed on the rear side of the terminal block 1. The three primary-side connection parts 12*a* are respectively connected to, for example, cables Ca for a three-phase power source. Each of the terminal connection parts 12 includes two secondary-side connection parts 12*b* connected to the primary-side connection part 12*a* in parallel. The secondary-side connection parts 12*b* are respectively connected to cables Cb for loads.

The terminal block 1 includes a first split body 21 and a second split body 22. The terminal block 1 is made up of the first split body 21 and the second split body 22 that are juxtaposed in the left-right direction and are coupled together. The first split body 21 includes two of the three terminal connection parts 12. The second split body 22 includes the remaining one of the three terminal connection parts 12. In the terminal block 1, accordingly, the first split body 21 and the second split body 22 are coupled together to make up the three terminal connection parts 12.

Figure 3:
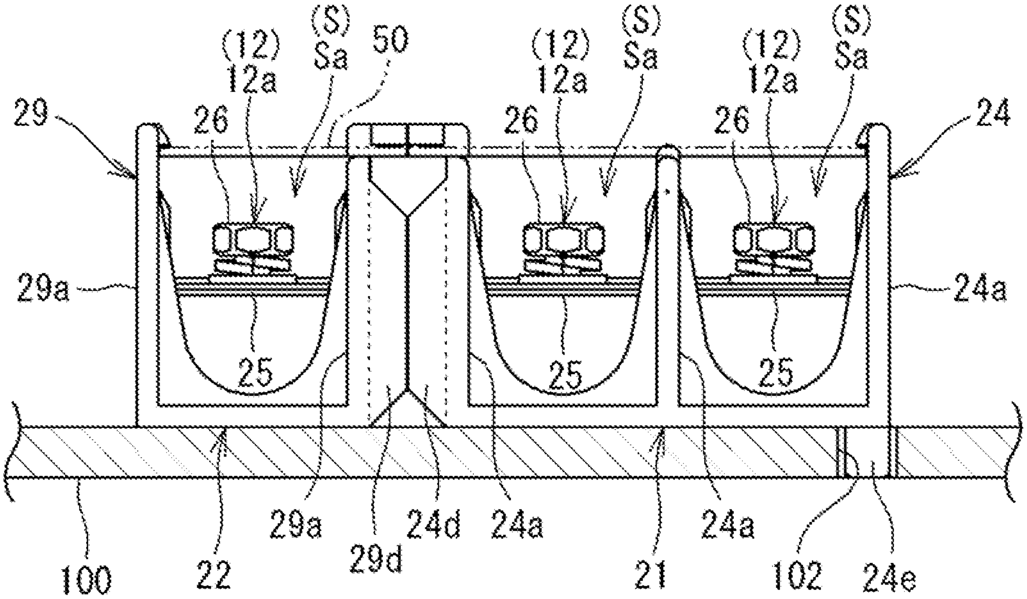
FIG. 3 is a fragmentary view in the direction of arrow A in FIG. 1.
Figure 4:
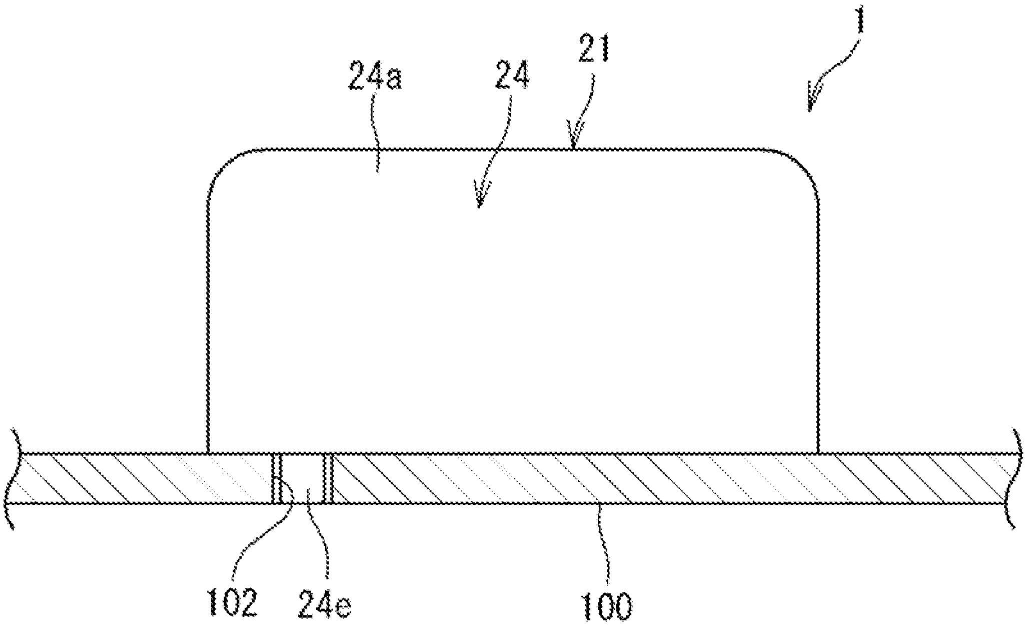
FIG. 4 is a fragmentary view in the direction of arrow B in FIG. 1.
Figure 5:
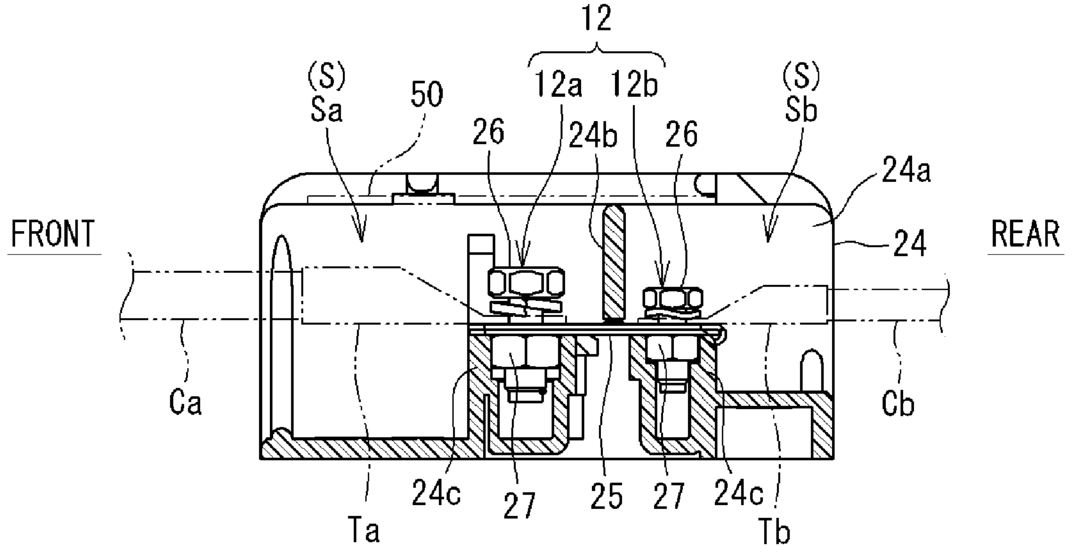
FIG. 5 is a sectional view taken along line C-C in FIG. 1.
Figure 6:
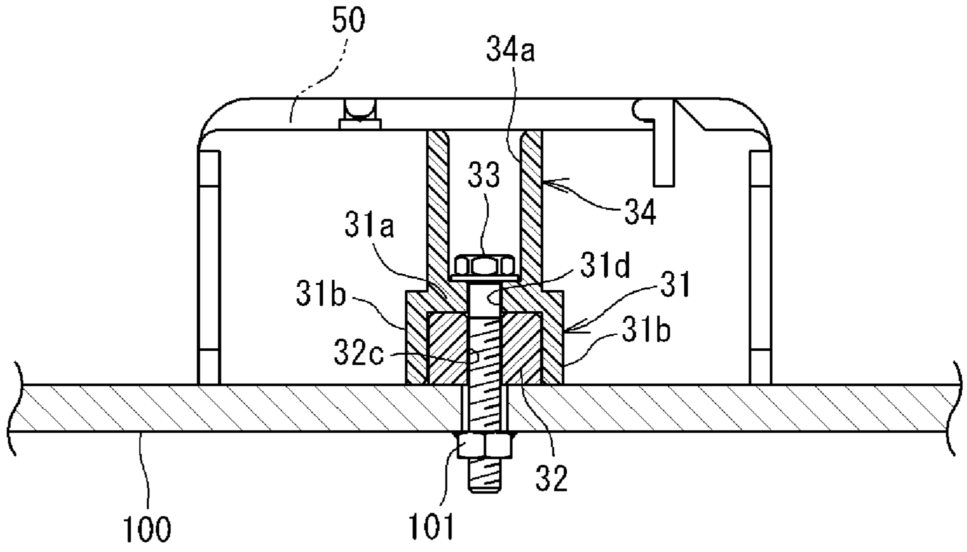
FIG. 6 is a sectional view taken along line D-D in FIG. 1.

FIG. 3 is a fragmentary view in the direction of arrow A in FIG. 1. FIG. 4 is a fragmentary view in the direction of arrow B in FIG. 1. FIG. 5 is a sectional view taken along line C-C in FIG. 1. FIG. 6 is a sectional view taken along line D-D in FIG. 1.

The first split body 21 includes a main body 24, a terminal plate 25, connection bolts 26, and connection nuts 27. The main body 24 is made of a synthetic resin material. For example, the main body 24 is formed by molding with a synthetic resin material into which glass fiber is mixed for enhancing flame retardancy.

As illustrated in FIG. 1, the main body 24 has three lengthwise walls 24*a* and two widthwise walls 24*b*. The three lengthwise walls 24*a* are arranged to extend in the front-rear direction, and are spaced apart from one another in parallel in the left-right direction. The three lengthwise walls 24*a* define two accommodation spaces S for accommodating terminals Ta and Tb of the cables Ca and Cb connected to the two terminal connection parts 12.

As illustrated in FIGS. 1 and 5, the two widthwise walls 24*b* divide each accommodation space S into a primary-side region Sa where the terminal Ta connected to the primary-side connection part 12*a* is disposed, and a secondary-side region Sb where the terminals Tb connected to the secondary-side connection parts 12*b* are disposed.

The terminal plate 25 is a plate-shaped member made of a conductor such as metal. The terminal plate 25 is disposed in the accommodation spaces S. The terminal plate 25 is located below the widthwise walls 24*b*. The terminal plate 25 extends to the primary-side regions Sa and the secondary-side regions Sb. The terminal plate 25 has insertion holes into which the connection bolts 26 are inserted, the insertion holes being opened at the primary-side regions Sa and the secondary-side regions Sb.

The connection bolts 26 are respectively inserted from above into the insertion holes in the terminal plate 25. The connection bolts 26 have lower ends respectively screwed into the connection nuts 27 located below the terminal plate 25. The connection nuts 27 are respectively held by holding portions 24*c* formed on the main body 24. The terminals Ta and Tb, such as ring terminals, of the cables Ca and Cb are respectively connected to the terminal plate 25 with the connection bolts 26. The terminals Ta and Tb connected to the terminal plate 25 with the connection bolts 26 are entirely accommodated in the accommodation spaces S (i.e., the primary-side regions Sa and the secondary-side regions Sb), respectively.

As illustrated in FIG. 1, the second split body 22 includes a main body 29, a terminal plate 25, connection bolts 26, and connection nuts. The main body 29 is made of a synthetic resin material as in the main body 24 of the first split body 21. For example, the main body 29 is made of a synthetic resin material into which glass fiber is mixed for enhancing flame retardancy.

As illustrated in FIG. 1, the main body 29 has two lengthwise walls 29*a* and one widthwise wall 29*b*. The two lengthwise walls 29*a* are spaced apart from each other in parallel in the left-right direction. The two lengthwise walls 29*a* define an accommodation space S for accommodating the terminals Ta and Tb of the cables Ca and Cb connected to the one terminal connection part 12.

The widthwise wall 29*b* divides the accommodation space S into a primary-side region Sa where the terminal Ta connected to the primary-side connection part 12*a* is disposed, and a secondary-side region Sb where the terminals Tb connected to the secondary-side connection parts 12*b* are disposed.

The terminal plate 25, connection bolts 26, and connection nuts of the second split body 22 are identical in configuration to the terminal plate 25, connection bolts 26, and connection nuts 27 of the first split body 21.

As illustrated in FIG. 2, the first split body 21 has a first coupling portion 31 formed on its side face adjacent to the second split body 22 (i.e., its left side face in FIG. 2), the first coupling portion 31 protruding toward the second split body 22. The second split body 22 has a second coupling portion 32 formed on its side face adjacent to the first split body 21 (i.e., its right side face in FIG. 2), the second coupling portion 32 protruding toward the first split body 21. The first coupling portion 31 and the second coupling portion 32 are located between the first split body 21 and the second split body 22 at a substantial center of the terminal block 1 in the front-rear direction.

Figure 7:
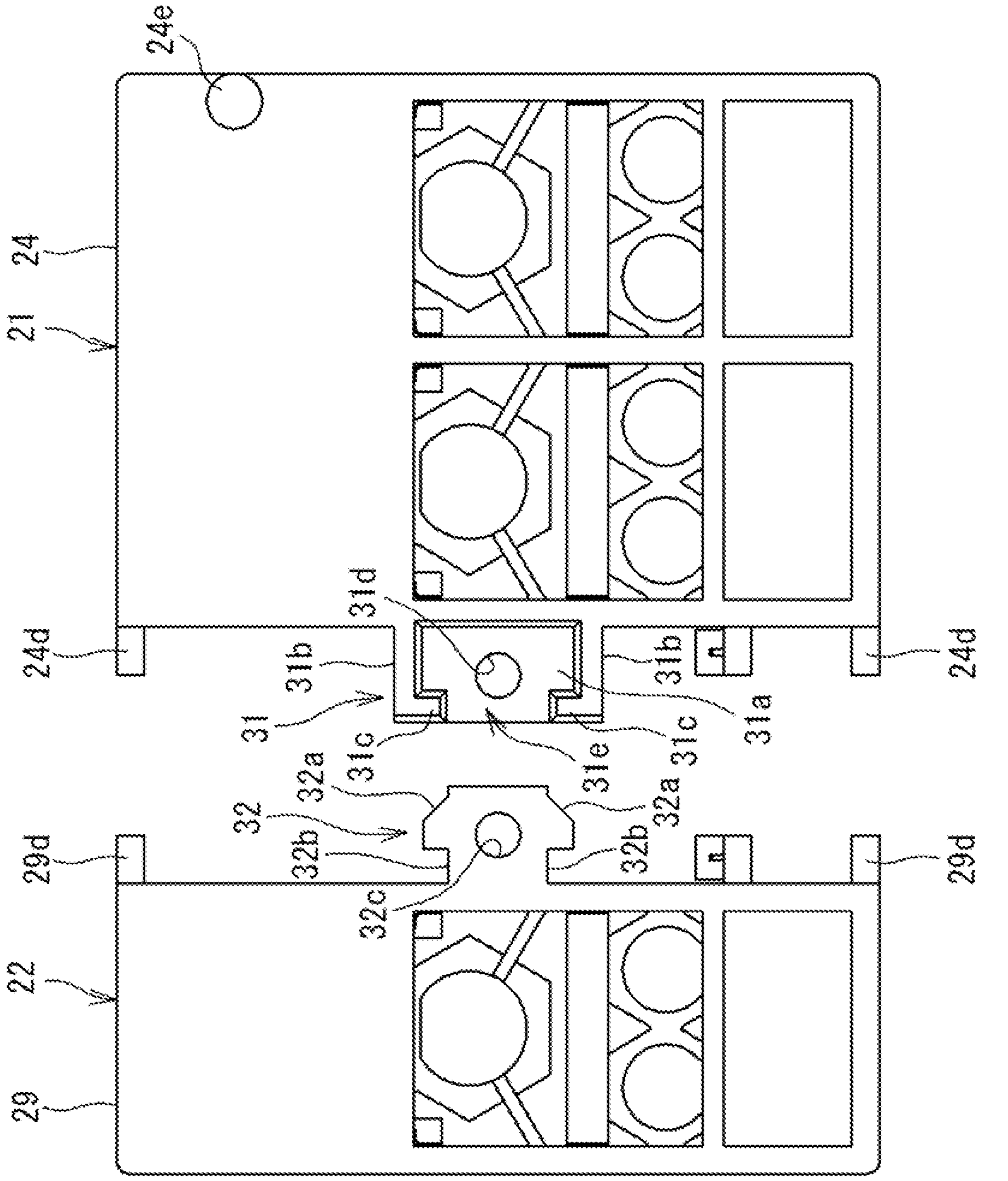
FIG. 7 is a bottom view of a state in which a first split body and a second split body of the terminal block are separated from each other.
Figure 8:
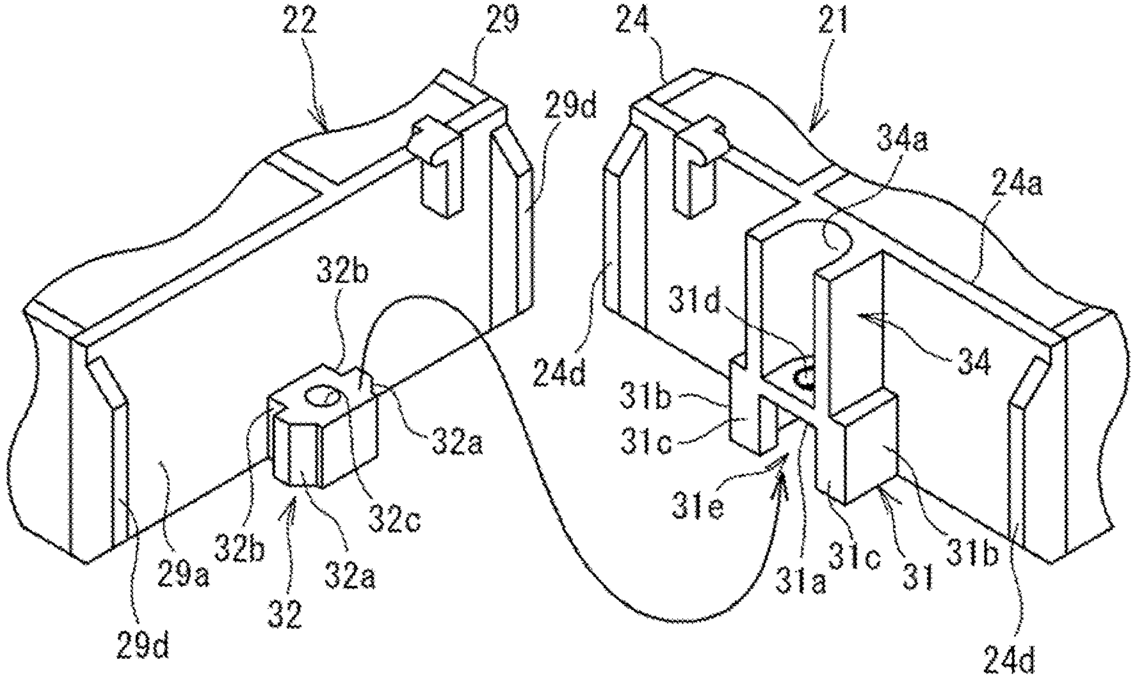
FIG. 8 is a perspective view of a first coupling portion of the first split body and a second coupling portion of the second split body.

FIG. 7 is a bottom view of a state in which the first split body 21 and second split body 22 of the terminal block 1 are separated from each other. FIG. 8 is a perspective view of the first coupling portion 31 of the first split body 21 and the second coupling portion 32 of the second split body 22.

The first coupling portion 31 is formed at a height that is equal to or less than a half height of the first split body 21. The first coupling portion 31 has an upper plate 31*a*, a pair of side plates 31*b*, and a pair of engagement claws 31*c*. The upper plate 31*a* has a rectangular shape as seen from above in plan view. The upper plate 31*a* has an insertion hole 31*d* into which a coupling bolt (a coupling member) 33 for coupling the first coupling portion 31 to the second coupling portion 32 is inserted.

The pair of side plates 31*b* respectively extend downward from a front edge and a rear edge of the upper plate 31*a*. Each of the side plates 31*b* has a rectangular shape in front view. The upper plate 31*a* and the pair of side plates 31*b* form a gate-shaped frame opened downward.

The pair of engagement claws 31*c* are respectively formed on distal ends of the side plates 31*b*. The first engagement claw 31*c* on the first side plate 31*b* extends toward the second side plate 31*b*. The second engagement claw 31*c* on the second side plate 31*b* extends toward the first side plate 31*b*. A space between the pair of engagement claws 31*c* is defined as an opening 31*e* through which the second coupling portion 32 is inserted.

As illustrated in FIGS. 6 and 8, the first coupling portion 31 has a guide portion 34 for guiding the coupling bolt 33 to the insertion hole 31*d*, the guide portion 34 being formed on the upper plate 31*a*. The guide portion 34 has a guide groove 34*a* formed in a semicircular shape and located to surround the insertion hole 31*d*. When the coupling bolt 33 is inserted along the guide groove 34*a*, the coupling bolt 33 is inserted into the insertion hole 31*d* with ease.

The second coupling portion 32 having a block shape is formed at a height that is equal to or less than a half height of the second split body 22. The second coupling portion 32 has tapered faces 32*a* chamfered diagonally and respectively formed on front and rear sides of its leading end face. The second coupling portion 32 also has engagement grooves 32*b* respectively formed on front and rear faces of its proximal portion, the engagement grooves 32*b* having a length equal to the height of the second coupling portion 32. The second coupling portion 32 also has an insertion hole 32*c* into which the coupling bolt 33 is inserted, the insertion hole 32*c* being a through hole extending in the upper-lower direction.

The second coupling portion 32 is inserted into the first coupling portion 31 from the lower side of the first coupling portion 31. As illustrated in FIG. 2, moreover, the engagement claws 31*c* of the first coupling portion 31 are inserted into the engagement grooves 32*b* in the second coupling portion 32. As illustrated in FIG. 6, then, the coupling bolt 33 is inserted from above into the insertion hole 31*d* in the upper plate 31*a* of the first coupling portion 31 and the insertion hole 32*c* in the second coupling portion 32. The coupling bolt 33 has a distal end screwed into a nut (an internal thread portion) 101 provided on a mount board (a mount member) 100, to which the terminal block 1 is mounted, in the electric component box. Therefore, the first coupling portion 31 and the second coupling portion 32 are both fastened to the mount board 100 with the coupling bolt 33. In other words, the coupling bolt 33 has a function of coupling the first coupling portion 31 to the second coupling portion 32, and a function as a fixing bolt (a fixing member) for fixing the first split body 21 and the second split body 22 to the mount board 100 in the electric component box. The internal thread portion 101 may be a threaded hole directly formed in the mount board 100, in place of a nut.

The first split body 21 and the second split body 22 are not separated from each other in the left-right direction in such a manner that the engagement claws 31*c* of the first coupling portion 31 are inserted into the engagement grooves 32*b* in the second coupling portion 32. The first coupling portion 31 and the second coupling portion 32 engage with each other against movements of the first split body 21 and second split body 22 away from each other. In addition, the second coupling portion 32 is held between the pair of side plates 31*b* of the first coupling portion 31. When the second coupling portion 32 is inserted into the first coupling portion 31, the pair of side plates 31*b* and the pair of engagement claws 31*c* position the second coupling portion 32, so that the insertion hole 31*d* in the first coupling portion 31 is aligned over the insertion hole 32*c* in the second coupling portion 32.

As illustrated in FIG. 1, the main body 24 of the first split body 21 has ridges 24*d* respectively formed on front and rear ends of its left side face, the ridges 24*d* protruding toward the second split body 22. The main body 29 of the second split body 22 has ridges 29*d* respectively formed on front and rear ends of its right side face, the ridges 29*d* protruding toward the first split body 21. When the first split body 21 is coupled to the second split body 22, distal ends of the ridges 24*d* on the first split body 21 are abutted against distal ends of the ridges 29*d* on the second split body 22.

As illustrated in FIGS. 2 and 3, the main body 24 of the first split body 21 has a protrusion 24*e* protruding from its bottom face. In one or more embodiments, the protrusion 24*e* has a columnar shape. The protrusion 24*e* is located in the vicinity of the right side face of the first split body 21, the right side face being farthest from the second split body 22. In addition, the protrusion 24*e* is located near the front side of the first split body 21. As illustrated in FIG. 4, the protrusion 24*e* is inserted into an engagement hole 102 formed in the mount board 100, to which the terminal block 1 is fixed, in the electric component box. The protrusion 24*e* is inserted into the engagement hole 102 to engage with the mount board 100. The protrusion 24*e* functions as a detent portion that restricts rotation of the terminal block 1 about the coupling bolt 33.

As described above, the terminal block 1 includes: the first split body 21 having the two terminal connection parts 12 and the first coupling portion 31; the second split body 22 having the one terminal connection part 12 and the second coupling portion 32 coupled to the first coupling portion 31; and the coupling bolt 33 coupling the first coupling portion 31 to the second coupling portion 32, the coupling bolt 33 being configured to fix the first split body 21 and the second split body 22 to the mount board 100 to which the terminal block 1 is mounted. Specifically, the coupling bolt 33 couples the first coupling portion 31 to the second coupling portion 32 and, additionally, serves as the fixing bolt (the fixing member) for fixing the first split body 21 and the second split body 22 to the mount board 100. With this configuration, the first split body 21 and the second split body 22 are fixed to the mount board 100 with the coupling bolt 33 for coupling the first split body 21 to the second split body 22. This configuration therefore achieves the operation of coupling the first split body 21 to the second split body 22 simultaneously with the operation of fixing the first split body 21 and the second split body 22 to the mount board 100. This configuration also simplifies a coupling structure for coupling the first split body 21 to the second split body 22 and a fixing structure for fixing the first split body 21 and the second split body 22 to the mount board 100.

The upper plate 31*a* of the first coupling portion 31 and the second coupling portion 32 vertically lie on top of each other (i.e., the upper plate 31*a* of the first coupling portion 31 vertically overlaps the second coupling portion 32). In addition, the coupling bolt 33 is screwed into the mount board 100 with the coupling bolt 33 passing through the first coupling portion 31 and the second coupling portion 32 in the direction in which the upper plate 31*a* of the first coupling portion 31 and the second coupling portion 32 lie on top of each other. Therefore, the first coupling portion 31 and the second coupling portion 32 can be both fastened to the mount board 100 with the coupling bolt 33. In addition, the first coupling portion 31 and the second coupling portion 32, which are coupled together, are fixed to the mount board 100.

The first split body 21 has the detent portion restricting the rotation of the terminal block 1 about the coupling bolt 33. Therefore, the orientation of the terminal block 1 is kept even when the terminal block 1 is fixed to the mount board 100 with one coupling bolt 33.

In addition, the detent portion includes the protrusion 24*e* configured to engage with the mount board 100. Therefore, the orientation of the terminal block 1 is kept with a simple structure. In one or more embodiments, one coupling bolt 33 and one protrusion 24*e* enable mounting of the terminal block 1 to the mount board 100 with a considerably simple configuration.

The first coupling portion 31 and the second coupling portion 32 engage with each other against the movements of the first coupling portion 31 and second coupling portion 32 away from each other. Therefore, the first coupling portion 31 and the second coupling portion 32 are firmly coupled together. This configuration therefore suppresses occurrence of wobbling between the first split body 21 and the second split body 22, and also suppresses occurrence of unstable coupling of the first split body 21 to the second split body 22. The wobbling between the first split body 21 and the second split body 22 is also suppressed with the second coupling portion 32 held between the pair of side plates 31*b* of the first coupling portion 31.

Each of the first split body 21 and the second split body 22 has the accommodation space S in which the terminals Ta and Tb connected to each terminal connection part 12 are entirely accommodated. This configuration therefore avoids contact between the terminals Ta and Tb of the adjacent cables Ca and Cb connected to each terminal connection part 12. This configuration therefore eliminates a necessity to cover the terminals Ta and Tb using, for example, an insulating tape, and simplifies wiring work.

The terminal block 1 according to one or more embodiments is made up of the two split bodies 21 and 22 coupled together. Therefore, the main bodies 24 and 29 of the split bodies 21 and 22 are made smaller as much as possible as compared with a case where the terminal block 1 is made up of a single member instead of the main bodies 24 and 29. Therefore, in the case where each of the main bodies 24 and 29 is formed by molding with a synthetic resin material, the synthetic resin material favorably flows into the die. In addition, the main bodies 24 and 29 thus molded are less prone to become deformed in such a manner that the cooling rate is made uniform as much as possible. This configuration therefore enhances moldability of the synthetic resin material into the split bodies 21 and 22. The glass fiber-containing synthetic resin material is particularly poor in fluidity into the die; therefore, the terminal block 1 made up of the two split bodies 21 and 22 is particularly effective.

In the terminal block 1, the mounting position of the coupling bolt 33 and the position of the protrusion 24*e* are located within a plane projection area of the terminal block 1. This configuration reduces the width of the terminal block 1 in the front-rear direction or the width of the terminal block 1 in the left-right direction as compared with a case where the coupling bolt 33 and the protrusion 24*e* protrude from the terminal block 1.

Figure 9:
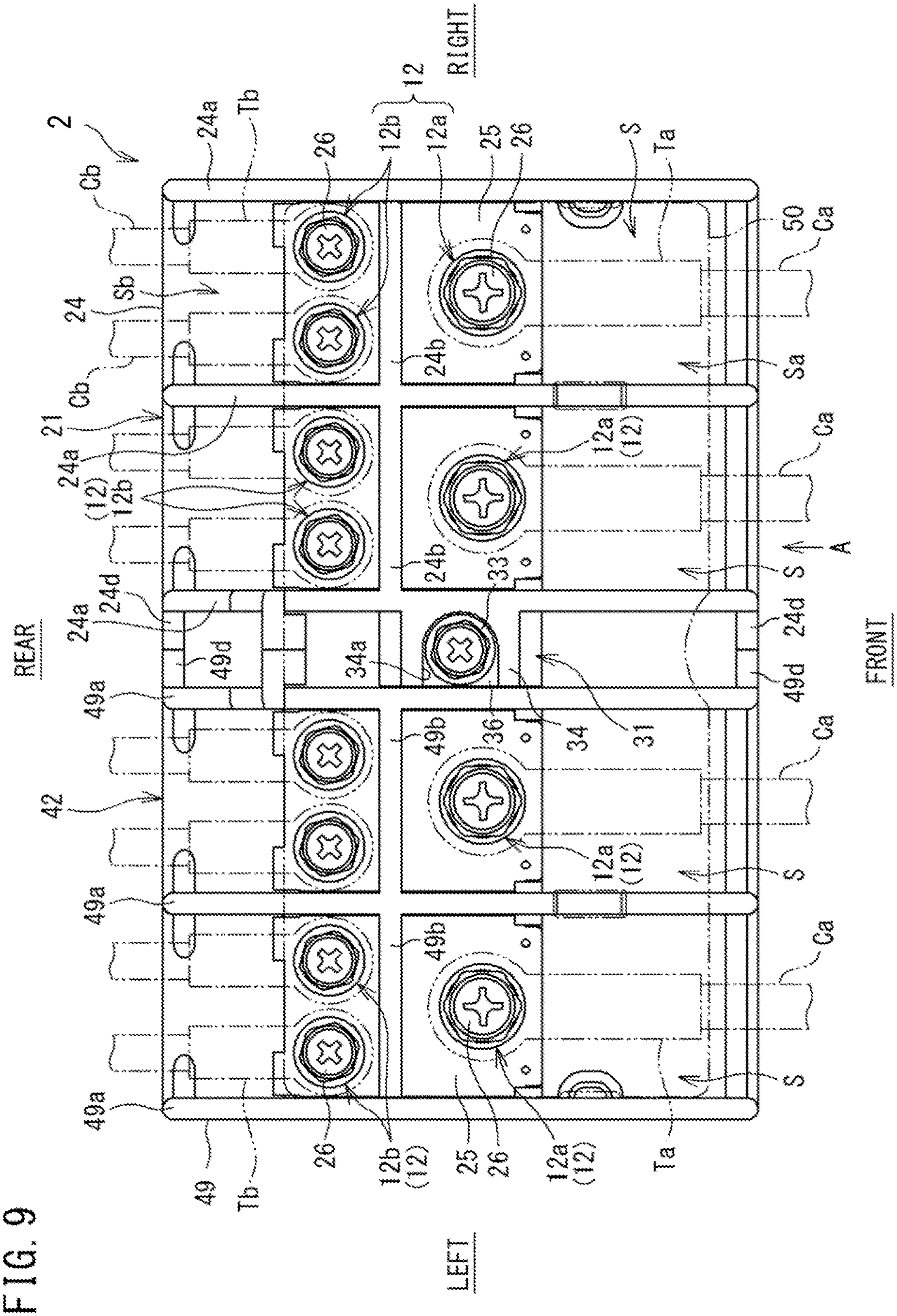
FIG. 9 is a plan view of a four-pole terminal block according to one or more embodiments.
Figure 10:
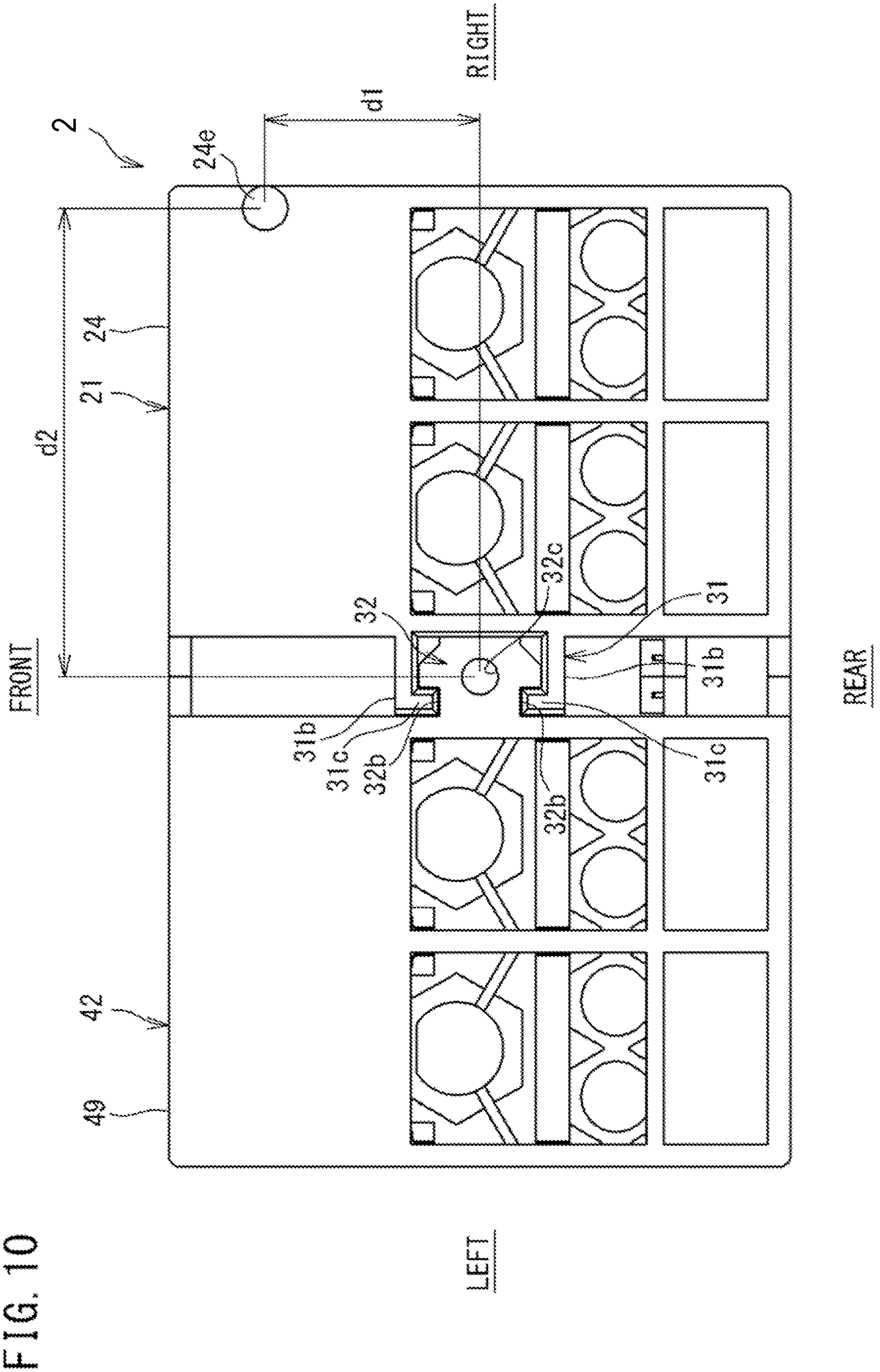
FIG. 10 is a bottom view of the terminal block illustrated in FIG. 9.

FIG. 9 is a plan view of a four-pole terminal block 2 according to one or more embodiments. FIG. 10 is a bottom view of the terminal block 2.

The terminal block 2 according to one or more embodiments includes four terminal connection parts 12. For example, in the terminal block 2, cables Ca of a three-phase power source including a neutral conductor are connected to primary-side connection parts 12*a* of the terminal connection portion 12. As in the case of the previously described embodiments, cables Cb for feeding electric power to loads in an outdoor unit are connected to secondary-side connection parts 12*b* of the terminal connection parts 12.

The terminal block 2 includes a first split body 21 and a second split body 42. Specifically, the terminal block 2 is made up of the first split body 21 and the second split body 42 coupled together. The first split body 21 includes two of the four terminal connection parts 12. The second split body 42 includes the remaining two of the four terminal connection parts 12.

The first split body 21 is identical to the first split body 21 in the previously described embodiments. Therefore, the three-pole terminal block 1 and the four-pole terminal block 2 include the same first split body 21. In the following description, the terminal block 1 is also referred to as a first terminal block 1, and the terminal block 2 is also referred to as a second terminal block 2.

The second split body 42 of the second terminal block 2 is different in number of poles from the second split body 22 of the first terminal block 1. Specifically, a main body 49 of the second split body 42 has three lengthwise walls 49*a* arranged to extend in parallel in the front-rear direction. The three lengthwise walls 49*a* define accommodation spaces S for terminals Ta and Tb of the cables Ca and Cb connected to the two terminal connection parts 12. The main body 49 of the second split body 42 also has two widthwise walls 49*b* that divide each accommodation space S into a primary-side region Sa and a secondary-side region Sb. The other configurations of the second split body 42 are similar to those of the second split body 22 of the first terminal block 1.

The first split body 21 is couplable to each of a plurality of types of second split bodies 22 and 42 having different numbers of poles. Therefore, by combining one type of the first split body 21 and each of a plurality of types of the second split bodies 22, 42, it is possible to manufacture a plurality of types of terminal blocks 1 and 2 having different numbers of poles. The terminal blocks 1 and 2 that are different in type from each other include the same first split body 21. This configuration therefore reduces kinds of components, resulting in manufacturing cost reduction.

In addition, the first terminal block 1 and the second terminal block 2 have a common relative positional relationship between the coupling bolt 33 inserted into the insertion holes 31*d* and 32*c* in the first and second coupling portions 31 and 32 and the protrusion 24*e* serving as the detent portion. As illustrated in FIGS. 2 and 10, specifically, the first terminal block 1 and the second terminal block 2 are identical to each other in regard to a distance d1 in the front-rear direction between the protrusion 24*e* and the insertion hole 32*c* corresponding to the insertion hole 31*d* of the first coupling portion 31 and a distance d2 in the left-right direction between the protrusion 24*e* and the insertion hole 32*c*. Accordingly, the mount board 100 to which the terminal block 1 or 2 is fixed has the nut 101 and the engagement hole 102 respectively located in accordance with the position of the coupling bolt 33 and the position of the protrusion 24*e*. Using the nut 101 and the engagement hole 102, both the first terminal block 1 and the second terminal block 2 are mountable to the mount board 100. It is therefore sufficient for the mount board 100 to have one set of the nut 101 and the engagement hole 102 that are in a predetermined relative positional relationship. This configuration simplifies the structure of the mount board 100.

The present invention is not limited to the foregoing exemplary description, and all changes that fall within metes and bounds of the claims, or equivalence such metes and bounds thereof are therefore intended to be embraced by the claims.

For example, the first split body 21 that makes up each of the terminal blocks 1 and 2 may include one terminal connection part 12 or may include three or more terminal connection parts 12. In addition, each of the second split bodies 22 and 42 that respectively make up the terminal blocks 1 and 2 may include three or more terminal connection parts 12.

Each of the second split bodies 22 and 42 may have the detent portion. In this case, the terminal blocks 1 and 2 may have a common relative positional relationship between the coupling bolt 33 (the insertion hole 32*c* in the second coupling portion 32) and the protrusion 24*e* serving as the detent portion even when the number of poles in each of the second split bodies 22 and 42 changes. With this configuration, by providing one set of the nut 101 and the engagement hole 102 on the mount board 100 side, each of a plurality of types of terminal blocks 1 and 2 having different numbers of poles can be mounted on the mount board 100.

The first split body 21 may have two or more first coupling portions 31. In addition, each of the second split bodies 22 and 42 may have two or more second coupling portions 32. For example, a plurality of sets of the first coupling portion 31 and the second coupling portion 32 which are arranged in the front-rear direction may be provided between the first split body 21 and the second split body. In this case, the first split body 21 is coupled to the second split body 22 or 42 with two or more coupling bolts 33. In addition, the first split body 21 and the second split body 22 or 42 are fixed to the mount board 100. This configuration also restricts rotation of each of the terminal blocks 1 and 2 even when each of the terminal blocks 1 and 2 is not provided with the protrusion 24*e* serving as the detent portion. In other words, one of the coupling bolts 33 serves as the detent portion.

The coupling member for coupling the first split body 21 to the second split body 22 or 42 may be any member such as a rivet in addition to the coupling bolt 33. The shape of the protrusion 24*e* serving as the detent portion may be, for example, a prismatic shape or a hook shape in addition to the cylindrical shape. Alternatively, the detent portion may be a hole with which a protrusion on the mount board 100 engages.

In each terminal connection part 12, two or more terminals Ta may be connected to the primary-side connection part 12*a* with the terminals Ta lying on top of each other. In addition, two or more terminals Tb may be connected to each secondary-side connection part 12*b* with the terminals Tb lying on top of each other.

In the foregoing embodiments, for convenience, the front-rear direction and the left-right direction are defined based on the illustration in FIG. 1. However, these directions are not limited. For example, the directions may be changed in accordance with a form in use. For example, in a case where the mount board 100 is disposed upright (in a case where the mount board 100 is oriented in the upper-lower direction), the front-rear direction or the left-right direction illustrated in FIG. 1 is replaced with the upper-lower direction.

Each of the terminal blocks 1 and 2 according to one or more embodiments of the present invention is mountable to any electric product in addition to an electric component box of an air conditioner.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: TERMINAL BLOCK
2: TERMINAL BLOCK
12: TERMINAL CONNECTION PART
21: FIRST SPLIT BODY
22: SECOND SPLIT BODY
24*e*: PROTRUSION (DETENT PORTION)
31: FIRST COUPLING PORTION
32: SECOND COUPLING PORTION
33: COUPLING BOLT
42: SECOND SPLIT BODY
100: MOUNT BOARD (MOUNT MEMBER)
S: ACCOMMODATION SPACE
Ta: TERMINAL
Tb: TERMINAL

The invention claimed is:

1. A terminal block comprising:

a first split body that comprises one or more terminal connection parts and a first coupling portion protruding from the first split body;

a second split body that comprises one or more terminal connection parts and a second coupling portion coupled to the first coupling portion; and a coupling member that couples the first coupling portion to the second coupling portion and fixes the first split body and the second split body to a mount to which the terminal block is mounted, wherein the first coupling portion comprises:

a pair of side plates having major surfaces that are parallel to each other and face each other in a direction that is perpendicular to a fixing direction in which the coupling member fixes the first split body and the second split body to the mount and that hold the second coupling portion therebetween; and an upper plate that comprises an insertion hole into which the coupling member is inserted, wherein the major surfaces of the pair of side plates, which face each other, and the upper plate enclose the second coupling portion from three different directions, and the pair of side plates are directly connected to the upper plate, the second coupling portion comprises an insertion hole, and only the coupling member is inserted into the insertion hole of the first coupling portion and the insertion hole of the second coupling portion.

2. The terminal block according to claim 1, wherein the first coupling portion overlaps the second coupling portion in the fixing direction, and the coupling member comprises a coupling bolt that is screwed into the mount and that passes through the first coupling portion and the second coupling portion in the fixing direction.

3. The terminal block according to claim 1, wherein the first coupling portion is couplable to the second coupling portion of the second split body that comprises a different number of poles.

4. The terminal block according to claim 3, wherein the first split body comprises a detent portion that restricts rotation of the terminal block about the coupling member.

5. The terminal block according to claim 1, wherein at least one of the first split body and the second split body has a detent portion that restricts rotation of the terminal block about the coupling member.

6. The terminal block according to claim 5, wherein the coupling member and the detent portion have a common relative positional relationship regardless a number of poles that the terminal block comprises.

7. The terminal block according to claim 5, wherein the detent portion comprises a protrusion that engages with the mount.

8. The terminal block according to claim 1, wherein the first coupling portion engages with the second coupling portion against a movement of the first coupling portion away from the second coupling portion.

9. The terminal block according to claim 1, wherein each of the first split body and the second split body has an accommodation space in which a terminal connected to each of the terminal connection parts is accommodated.

10. An air conditioner comprising:

the terminal block according to claim 1.

* * * * *